(12) United States Patent
Lacey

(10) Patent No.: US 9,221,372 B1
(45) Date of Patent: Dec. 29, 2015

(54) SANITIZED PROTECTIVE SEAT COVER KIT WITH DISINFECTING AGENT

(71) Applicant: Arlene Anna Lacey, Fayetteville, GA (US)

(72) Inventor: Arlene Anna Lacey, Fayetteville, GA (US)

( * ) Notice: Subject to any disclaimer, the term of this patent is extended or adjusted under 35 U.S.C. 154(b) by 0 days.

(21) Appl. No.: 14/335,256

(22) Filed: Jul. 18, 2014

(51) Int. Cl.
*A47C 31/11* (2006.01)
*B60N 2/60* (2006.01)

(52) U.S. Cl.
CPC .............. *B60N 2/6027* (2013.01); *B60N 2/60* (2013.01)

(58) Field of Classification Search
CPC ................................ B60N 2/60; B60N 2/6027
USPC .............................................. 297/219.1–229
See application file for complete search history.

(56) References Cited

U.S. PATENT DOCUMENTS

| | | | | |
|---|---|---|---|---|
| 4,886,697 A * | 12/1989 | Perdelwitz et al. | ........ | 297/229 X |
| 5,626,397 A * | 5/1997 | Reid | ........... | 297/229 X |
| 5,806,925 A * | 9/1998 | Hanley | ........... | 297/229 |
| 5,833,309 A * | 11/1998 | Schmitz | ........... | 297/228.11 X |
| 6,428,098 B1 * | 8/2002 | Allbaugh | ........... | 297/219.12 |
| 6,655,736 B1 * | 12/2003 | Arenas | ........... | 297/229 |
| 6,659,551 B1 * | 12/2003 | Arenas | ........... | 297/229 |
| 6,676,209 B1 * | 1/2004 | Szabo et al. | ........... | 297/229 X |
| 6,817,663 B1 * | 11/2004 | Stuart | ........... | 297/228 X |
| 6,948,771 B1 | 9/2005 | Salandy | | |
| 7,278,649 B2 * | 10/2007 | Daniels | ........... | 297/228 X |
| 7,438,356 B2 * | 10/2008 | Howman et al. | ........... | 297/229 X |
| 7,461,894 B2 * | 12/2008 | Leeds | ........... | 297/229 |
| 7,469,962 B2 * | 12/2008 | Paulin | ........... | 297/229 |
| 7,686,392 B2 * | 3/2010 | Kenny | ........... | 297/229 |
| 7,695,066 B2 | 4/2010 | Guercia et al. | | |
| 7,959,227 B2 * | 6/2011 | Miller | ........... | 297/229 X |
| 8,500,199 B2 * | 8/2013 | Paulin | ........... | 297/229 |
| 8,662,584 B1 * | 3/2014 | Townsend | ........... | 297/229 |
| 8,950,807 B2 * | 2/2015 | Lerm | ........... | 297/228 X |
| 9,004,592 B2 * | 4/2015 | Boston | ........... | 297/229 X |
| 2006/0076810 A1 * | 4/2006 | Nichols | ........... | 297/220 |
| 2007/0145798 A1 * | 6/2007 | Nadler-Sachs | ........... | 297/229 X |
| 2007/0210629 A1 * | 9/2007 | Berge | ........... | 297/229 |
| 2008/0079297 A1 * | 4/2008 | Braxton Perry | ........... | 297/219.12 |
| 2008/0191529 A1 * | 8/2008 | Guercia et al. | ........... | 297/229 |
| 2009/0140562 A1 | 6/2009 | Boulware, Sr. | | |
| 2010/0139001 A1 * | 6/2010 | Mangano | ........... | 297/229 X |
| 2012/0074745 A1 | 3/2012 | Paulin | | |
| 2012/0187732 A1 * | 7/2012 | Lerm | ........... | 297/219.12 |
| 2012/0193958 A1 | 8/2012 | DePasquale | | |
| 2013/0299382 A1 | 11/2013 | Mullis | | |
| 2014/0028063 A1 * | 1/2014 | Firestone, Paul A. | ... | 297/188.01 |
| 2014/0145478 A1 * | 5/2014 | Boston, Barbara | ....... | 297/228 X |
| 2014/0223666 A1 * | 8/2014 | Pavlin | ........... | 297/229 X |
| 2014/0265483 A1 * | 9/2014 | Miller | ........... | 297/228 |
| 2015/0097402 A1 * | 4/2015 | Bee | ........... | 297/229 |

* cited by examiner

*Primary Examiner* — Rodney B White
(74) *Attorney, Agent, or Firm* — J. T. Hollin, Jr. Attorney at Law, P.C.

(57) ABSTRACT

The protective seat cover kit is a specially fabricated sanitary and protective seat covering comprising a back section, a seat section, left and right wings, and a pouch containing a sani-pac. The sani-pac contains fumigant particles secured in place by a fine mesh overlaid by an airtight flap. A traveler using the seat cover kit places it over the corresponding parts of a passenger seat to protect the traveler from harmful bacteria or germs that may have been deposited onto the seat by a prior occupant. After use of the protective seat cover, the fumigant particles in the sani-pac, may be exposed to air circulation by the opening of the flap. The protective seat cover is then folded along designated seams and placed completely within the pouch, thus allowing the fumigant particles to sanitize and disinfect the protective seat cover as it is folded within the confines of the pouch.

6 Claims, 3 Drawing Sheets

SANITIZED PROTECTIVE SEAT COVER KIT WITH DISINFECTING AGENT

REFERENCE TO RELATED APPLICATION

Not Applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION (1) Field of the Invention

The inventive concept presented herein generally is concerned with devices and methods of protecting travelers from exposure to potentially harmful substances on passenger seats. The disclosed sanitized protective seat cover kit is designed to provide such protection and also serve as a means of disinfecting the seat cover itself after use on a passenger seat.

Unfortunately, residue, germs, head lice, and bacteria originating from the previous user of a passenger seat can all be deposited onto the seat. These substances are easily transferred to the next person who sits in the seat. Because of this, passenger seats installed on the various modes of public transportation vehicles can be a breeding ground for germs and bacteria that cause colds, flu and other infectious diseases.

It may be discomforting to recall the potential consequences which can result from relaxing in the confines of a passenger seat. However this common event can result in a significant amount of germs and bacteria being transferred onto the head, neck, arms, and hands of a user. There is a need for a consumer product that would protect travelers from exposure to potentially harmful substances on passenger seats. The present protective seat cover kit is intended to provide such protection and also serve as a means of disinfecting the seat cover after use on a passenger seat.

(2) Description of the Related Art

The following references have some related similarities, either in function or construction, to the inventive concept:

U.S. Pat. No. 6,948,771 (Sep. 27, 2005) Disclosed is a portable seat cover to cover the back of a variety of seats has drawstrings on its side to adjust to a variety of seat backs, a head rest that is stowable when there are no headrest to cover, and a built-in pouch into which can be folded the portable seat cover.

US Published Patent Application #2007/0210629 (Sep. 13, 2007; The invention is a novel fitted sheet for a plane or train seat comprising a cotton hood section for attachment to the top of the seat; a main cotton body section affixed to the hood section for covering the seat; a means for attaching the sheet to the bottom of the seat; nd a carrying bag to store the sheet.

WO 2008027810 (Mar. 6, 2008) This disclosure provides a cover that can be removably applied to an infant or children's car seat. The seat cover is integral with a carry pouch that the car cover can be folded into and stored in when not in use. When the cover is thus stored in the pouch, it takes on the shape and feel of a cushion and can be used as such. The waterproof pouch can also facilitates the handling of a soiled seat cover.

US Published Patent Application #2009/0140562 (Jun. 4, 2009) A combined deodorizing and air freshening vehicle seat cushion for removing odors and releasing a pleasant aroma in a vehicle may include primary bodies oriented in a side-by-side configuration. The primary bodies may include a predetermined quantity of a deodorizing agent contained within an internal cavity of the primary bodies for filtering and deodorizing the airborne odor in the ambient air. Pairs of flaps may automatically pivot between closed and tensioned open positions when an external force is exerted onto the seat cover such that air may be laterally forced out of the primary bodies, through the flaps, and into the auxiliary bodies to be impregnated with pleasant aromas. Thereafter, the freshened air may be released into the vehicle through outlet ports of the auxiliary bodies.

U.S. Pat. No. 7,695,066 (Apr. 13, 2010) Disclosed is a single-use disposable sanitary cover which temporarily houses a section of a seat and mitigates virus and germ contact on a person's body. The disposable sanitary cover includes a flexible elongated sleeve having an outer shell, an interior cavity and an elongated slit forming a rim equipped with a stabilizing means integrally associated therewith. The stabilizing means is preferably an elastic band or segment that engages with the rear of the back support and seat areas of the chair to secure the elongated sleeve in place. The seat area and/or back support area of the chair is received through the elongated slit and is housed within the elongated sleeve in order to mitigate contact between the chair surface and a person's body.

US Published Patent Application #20120074745 (Mar. 29, 2012); The invention relates to a folding chair cover comprised of first and second sheets of non-woven fabric attached together along strategically sized and shaped respective edges thereof. The non-woven sheets are cut from bolts of non-woven fabric in such a manner as to effectively use the least amount of non-woven material in the creation of the covers.

US Published Patent Application #2012/0193958 (Aug. 2, 2012) A travel cocoon wrap is a specially designed protective covering configured specifically to be applied over the headrests of public seats, thus protecting the user from any harmful debris deposited onto the seats by other users. The travel cocoon wrap is manufactured of ultrasoft and lightweight fleece material and is comprised of a fitted, rectangular shaped sheath designed to slide over the headrest, encompassing the front of the headrest completely, while the base of the unit extends down the seat's backrest.

US Published Patent Application #2013/0299382 (Nov. 14, 2013); The invention is a germ/barrier travel kit sized, shaped and configured to carry articles necessary for germ prevention and sterilization. In one embodiment, the germ/barrier travel kit consists of a bag/container including but not limited to: toilet seat cover, face mask, gloves, head rest cover and hygiene/disinfecting wipes. However, the germ/barrier travel kit may also be configured to carry additional wipes or barriers. The germ/barrier travel kit is configured to permit ready and easy access to articles needed by travelers to defend against germs and preventing disease transmission.

BRIEF SUMMARY OF THE INVENTIVE CONCEPT

The inventive concept herein involves a protective seat cover and disinfectant kit to be used by travelers when seated on various means of public transportation. Busses, trains, and airplanes are utilized by millions of people on a daily basis. Whether on a business trip, a commuter ride from residence to an office, or personal pleasure trip, millions of persons often sit upon a public passenger seat en route to their destination.

The protective seat cover kit is a specially fabricated sanitary and protective seat cover 1 comprising a back section 3, a seat section 4, and a header 2/pouch 14, combination. The pouch 14 contains a smaller unit, referred to as a "sani-pac" 30 the sani-pac 30 being substantially filled with fumigant particles 35. The fumigant particles 35 are secured in place within the sani-pac 30 by means of a fine mesh 34.

The objective of the seat cover kit 1 is to protect the user from any harmful bacteria or germs that may have been deposited onto a passenger seat 20 by a previous traveler. After active use of the protective seat cover 1, it may be folded along designated seams and placed completely within the pouch 14. The fumigant particles 35 in the sani-pac 30, when exposed by the opening of an airtight flap 31, serve to sanitize the protective seat cover 1 while the seat cover 1 is folded within the confines of the pouch 14. The fumigant particles are enabled to emit aromatic vapors through the mesh 34 constructed on the top surface 37 of the sani-pac 30.

BRIEF DESCRIPTION OF THE VIEWS OF THE DRAWINGS

The objects, features, and advantages of the concept presented in this application are more readily understood when referring to the accompanying drawings. The drawings, totaling five figures, show the basic functions of various embodiments and methods. In the several figures, like reference numbers are used in each figure to correspond to the same component as may be depicted in other figures.

TABLE 1

Figure 1:
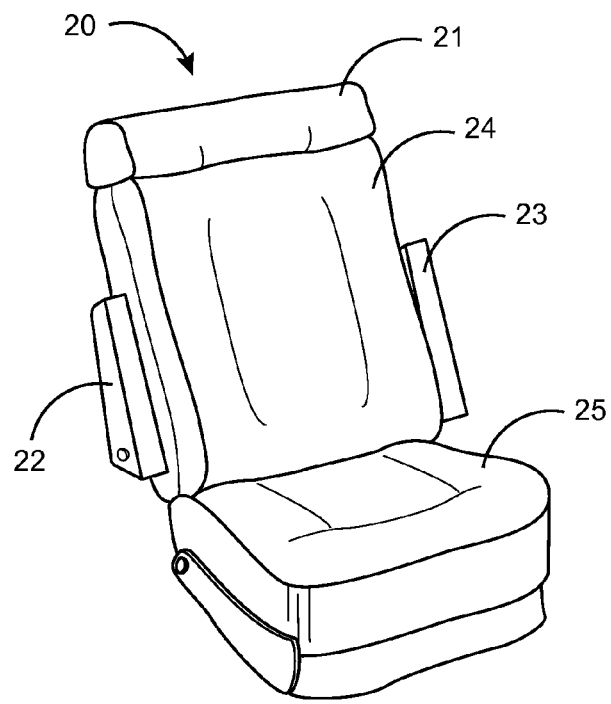
FIG. 1 is a view of a passenger seat 20 commonly found in passenger airplanes, trains, and busses.

| Nomenclature for Protective Seat Cover | |
| --- | --- |
| 1. | Protective seat cover |
| 2. | Header |
| 3. | Back section |
| 4. | Seat section |
| 5. | Right wing |
| 6. | Left wing |
| 7. | Right cuff |
| 8. | Left cuff |
| 9. | Left seam |
| 10. | Right seam |
| 11. | Back seam |
| 12. | Left fastener |
| 13. | Right fastener |
| 14. | Pouch |
| 15. | Slider |
| 16. | First sealer |
| 17. | Second sealer |
| 18.-19. | n/a |
| 20. | Passenger seat |
| 21. | Headrest |
| 22. | Right armrest |
| 23. | Left armrest |
| 24. | Seatback |
| 25. | Seat cushion |
| 26.-29. | n/a |
| 30. | Sani-pac |
| 31. | Flap |

TABLE 1-continued

| Nomenclature for Protective Seat Cover | |
| --- | --- |
| 32. | Detachable border |
| 33. | Fixed border |
| 34. | Mesh |
| 35. | Fumigant particles |
| 36. | Pac upper surface |
| 37. | Pac under surface |

DETAILED DESCRIPTION

The objective of the seat cover kit 1 is to protect a user from any harmful bacteria or germs that may have been deposited onto a passenger seat 20 by a previous traveler. After active use of the protective seat cover 1, it may be folded along designated seams 9, 10, 11 and repetitively folded along its length for storage completely within the pouch 14. The fumigant particles 35 in the sani-pac 30, when exposed to air by the opening of an airtight flap 31, serve to sanitize the protective seat cover 1 while the seat cover 1 is folded within the confines of the pouch 14. The fumigant particles 35 are allowed to emit their aromatic vapors through a mesh 34 constructed on the top surface 36 of the sani-pac 30.

The undersurface 37 of the sani-pac 30 may be used for attachment to the inner surface of the pouch 14, either by adhesive, stitching, hook-and-felt fastener, or other means. The sani-pac 30 may be detachable for replacement at appropriate times. the header, back section, cushion section, right wing, left wing, right cuff, and left cuff are constructed from a fabric possessing the physical property of allowing moisture vapor to be transmitted through the material and further, allowing air to pass through the material.

The description of the inventive concept is best understood by reference to the accompanying drawing figures, totaling five in number. In FIG. 1 there is presented a typical passenger seat 20 commonly installed in airline cabins, busses, and passenger trains. The passenger seat 20, as shown, is furnished with a headrest 21, a seatback 24, a seat cushion 25, a left armrest 22 and a right armrest 23.

Figure 2:
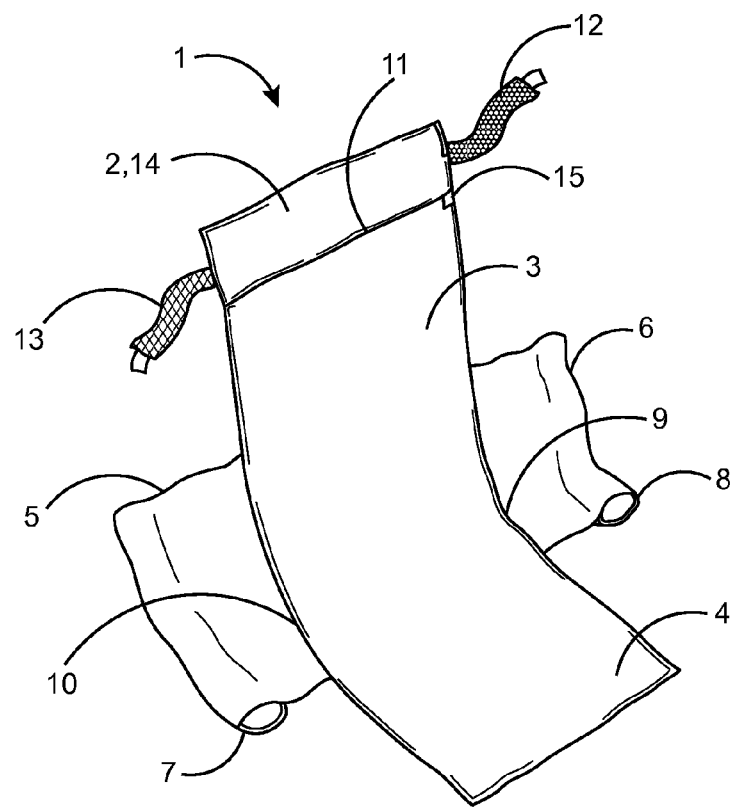
FIG. 2 is a view of the protective seat cover 1 fully opened and ready for placement over a passenger seat.

FIG. 2 depicts the inventive concept, the protective seat cover 1 having been fully deployed and ready to drape onto a passenger seat 20. The protective seat cover 1 is a specially fabricated from a "breathable" fabric, and consists of a back section 3, a seat section 4, and a header 2/pouch 14 containing a sani-pac 30 (shown partially enclosed in FIG. 3). The sani-pac 30 is furnished with fumigant particles 35 secured within the sani-pac 30 by means of a fine mesh 34.

Referring to FIG. 2, a user, desiring protection from potentially harmful substances, places the main components of the protective seat cover kit 1, the back section 3 and the seat section 4, over the corresponding seatback 24 and the seat cushion 25 of the passenger seat 20. Should the passenger seat 20 be equipped with armrests, such as armrests 22, 23 shown in FIG. 1, the left wing 6 and right wing 5 of the protective seat cover 1 are either draped over the armrests 22, 23 of the passenger seat 20, or the left tubular cuff 8 and right tubular cuff 7 may be used to slidably position the left wing 6 and right wing 8 so as lo envelope the armrests 22, 23 of the passenger seat 20.

The header 2 of the protective seat cover 1 also co-functions as a pouch 14 which may be placed against the headrest 21 of the passenger seat 20. A left fastener 12 and a right fastener 13 are utilized to secure the header 2 and the pouch 14 to the passenger seat 20. The left fastener 12 and right fastener 13 may comprise the complementary segments of a hookand-felt fastening mechanism. Further, the left fastener 12 and right fastener 13 may also consist of an elongated strap and buckle fastener, or any other type of attaching means which adequately accomplishes the function of securing the header 2 and pouch 14 to the headrest 21.

Figure 3:
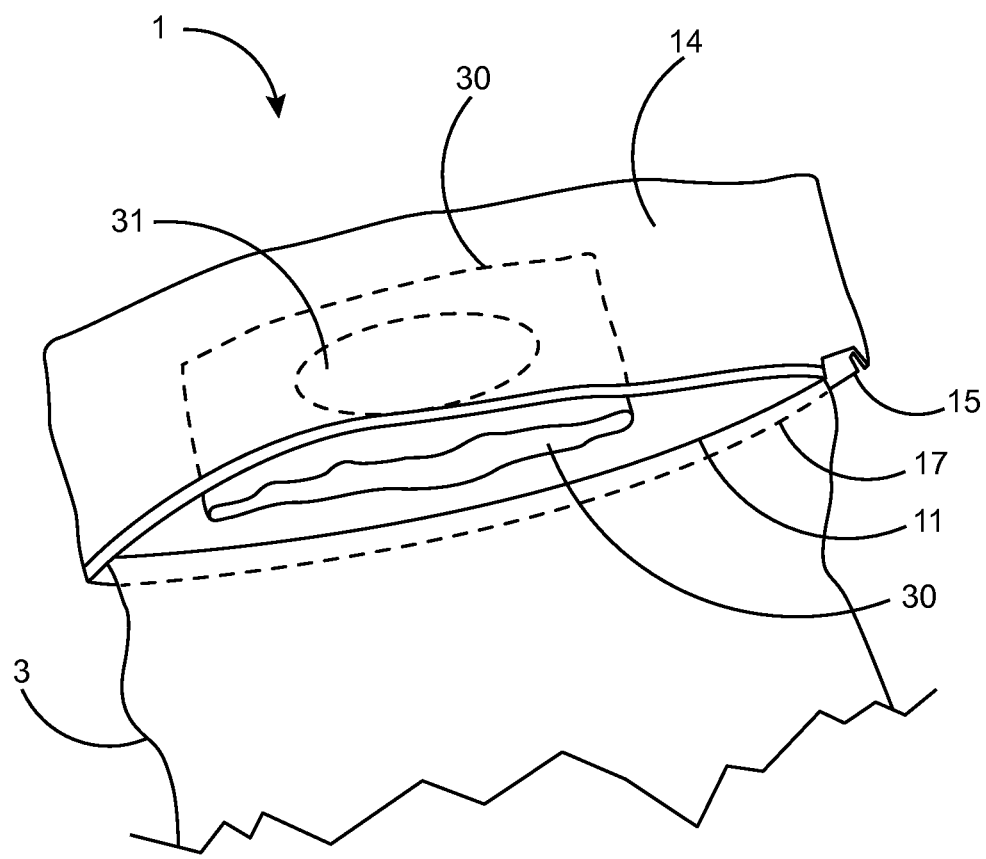
FIG. 3 illustrates the pouch 14 having been opened.

In FIG. 3, there is depicted the uppermost section of the protective seat cover 1 with the pouch 14 partially opened. In normal use and transportation by a traveler, the pouch 14 is maintained in the closed configuration by a Zip-loc®-type fastening mechanism comprising a slider 15, a first sealer 16, and a second sealer 17. The pouch 14 is permanently attached to the top section of the back section 3 of the protective seat cover 1 by a sewn or glued back seam 11. Within the confines of the pouch 14 is an openable sani-pac 30 containing a quantity of fumigant particles 35 (shown in FIG. 4 and FIG. 5). In the preferred embodiment, the fumigant particles 35 are characterized by a physical quality of emitting vapors by sublimation when exposed to air.

Figure 4:
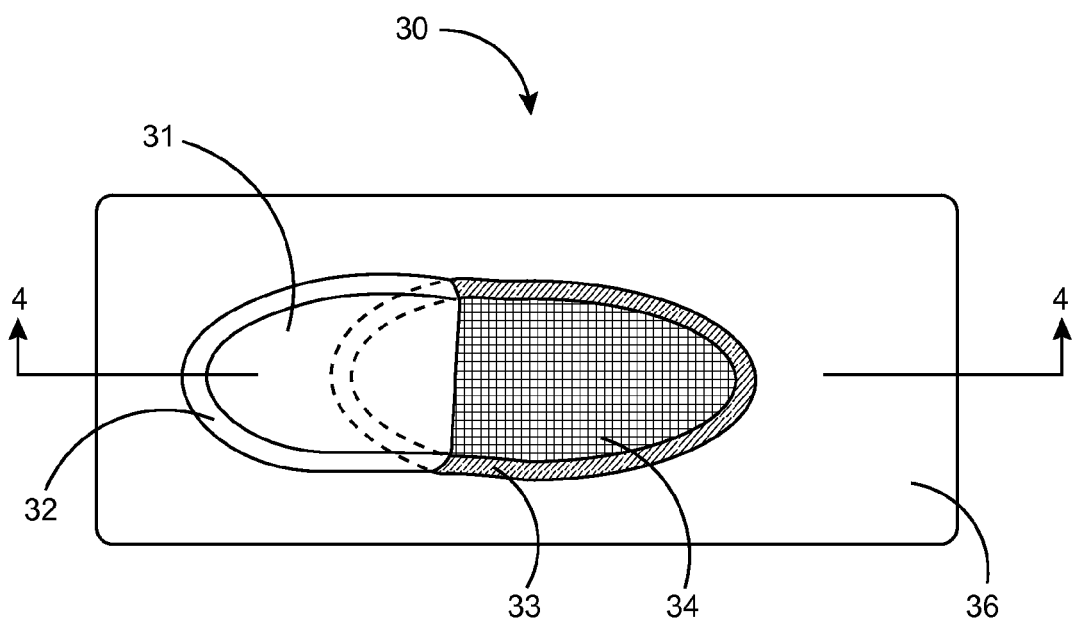
FIG. 4 shows the sani-pac 30 upon removal from the pouch 14 and unsealing of the covering flap 31.

In viewing FIG. 4, there is shown a view of the top surface of the sani-pac 30 with its flap 31 having been partially opened. The flap 31 comprises a fixed border 33 which may consist of an adhesive surface, and also a detachable border 32 of a material receptive to the adhesive bonding of the fixed border 33. Alternatively, the fixed border 33 and the detachable border 32 may comprise complementary components of a hook-and-felt type fastening mechanism or other types of attaching devices.

Figure 5:
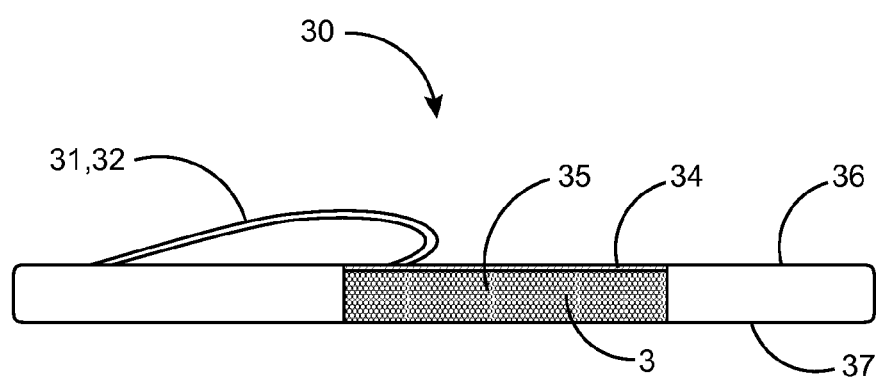
FIG. 5 is a cross-sectional view of the sani-pac 30 as seen from the section line 4-4.

After use of the protective seat cover 1 during a segment of traveling, a user may seek to disinfect or otherwise provide sanitary cleaning of the protective seat cover 1. This is accomplished by unsealing the pouch 14, then separating the flap 31 from its connection with the fixed border 33, and thereby exposing the fine mesh 34 covering. The mesh 34 serves to hold the fumigant particles 35 in place interiorly to the sani-pac 30. FIG. 5 displays the upper surface 36 and the under surface 37 of sani-pac 30 and the fully-opened the flap 31. In this configuration the fumigant particles 35 are enabled to emit vapors through the mesh 34. The under surface of the sani-pac 30 may be secured to an interior surface of the pouch 14 by means of an adhesive, stitching, a hook-and-felt fastening mechanism, or other arrangements.

With the sani-pac 30 thus opened, the aromatic qualities and vaporous characteristic of the fumigant particles 35 is made available. The user then re-seals the pouch 14 and folds the protective seat cover 1 along the right seam 10, the left seam 9, and the back seam 11. Further folding is continued in sections along the length of the back section 3 and seat section 4 of the protective seat cover 1, thus arranging the protective seat cover 1 into a compact package for storage in carry-on luggage or a travel bag. While the protective seat cover 1 is thus compacted, release of the fumigant particles 35 begins an ongoing process of neutralizing and/or killing bacteria, germs, and other unsanitary particles that may have been encountered during contact of the protective seat cover 1 with the passenger seat 20 used by the traveler.

The sani-pac 30 is disposable and may be replaced by supplemental units of the sani-pac 30 as may be carried by the traveler. A complementary embodiment of the seat protective cover 1 is designed and configured to carry multiple sani-pac 30 units within the pouch 14.

While certain embodiments of the present inventive concept have been shown and disclosed herein, it will be obvious to those persons skilled in the art that such embodiments are presented by way of example only and not as a limitation to the scope of the inventive concept. Variations, changes, and substitutions may occur or be suggested to those skilled in the art without departing from the intent, scope, and totality of this inventive concept. Accordingly, it is intended that this inventive concept not be limited by the scope of the accompanying claims, but by the entirety of the disclosure presented.

What is claimed is:

1. A protective seat cover kit, comprising:
   (a) a closeable, pouch section contained within a horizontally-oriented header, said header having a left fastener and a right fastener; (b) a foldable, primarily oblong back section attached to said header by means of a back seam; said back section having a longitudinal left seam with a left wing and a left tubular cuff attached to said left seam and a longitudinal right seam with a right wing and a right tubular cuff attached to said right seam; (c) a seat section longitudinally integral to and extending from said back section, (d) a sani-pac disposed within said pouch section, said sani-pac comprising a packet-shaped structure having an under surface, and an upper surface with a fixed border permanently attached to said upper surface; (e) an airtight flap, said flap having a border corresponding to the dimensions of said fixed border, said flap border being detachably connected to the fixed border; and (f) a quantity of fumigant/disinfectant agent contained within said sani-pac, said agent contained by means of a fine mesh disposed immediately underneath said flap, the agent further characterized by sublimation when exposed to air; wherein
   said back section and said seat section, when completely unfolded comprise dimensions corresponding to an exterior useable surface of a passenger seat installed on any of various means of public transportation vehicles, whereby said header is secured to a headrest of said passenger seat by means of the left and right fasteners, said back section substantially covers a seatback of said passenger seat, said seat section substantially covers a seat cushion of said passenger seat, said left wing substantially covers a left armrest of said passenger seat, said right wing substantially covers a right armrest of said passenger seat, with said left and right tubular cuffs enclosing the armrests of the seat, and further,
   for storage and ease of transport, said protective seat cover may be easily compacted by means of folding the left wing inward along the left seam of the back section, folding the right wing inward along the right seam of the back section, and thereupon folding the seat section inward toward the back section a plurality of times until the adjoined back section and the seat section may be foldably placed into and stored within the confines of said pouch section.

2. A protective seat cover kit as in claim 1, wherein the header back section, seat section, right wing, and left wing are constructed from a fabric possessing a material property that allows water vapor to be transmitted through the material and further, allows air to pass through the fabric and further, said left and right fasteners comprise complementary segments of hook-and-felt type fastening mechanism.

3. A protective seat cover kit as in claim 1, wherein the under surface of the sani-pac may be attached to an inner surface of the pouch, either by adhesive, stitching, hook-and-felt mechanism, or other fastening means.

4. A protective seat cover kit, comprising:
   (a) a closeable, pouch section contained within a horizontally-oriented header, said header having a left fastener and a right fastener; (b) a foldable, primarily oblong back section attached to said header by means of a back seam; said back section having a longitudinal left seam with a left wing and a left tubular cuff attached to said left seam and a longitudinal right seam with a right wing and a right tubular cuff attached to said right seam; (c) a seat section longitudinally integral to and extending from said back section, (d) a sani-pac disposed within said pouch section, said sani-pac comprising a packet-shaped structure having an under surface, and an upper surface with a fixed border permanently attached to said upper surface; (e) an airtight flap, said flap having a border corresponding to the dimensions of said fixed border, said flap border being detachably connected to the fixed border; and (f) a quantity of fumigant/disinfectant agent contained within said sani-pac, said agent contained by means of a fine mesh disposed immediately underneath said flap, the agent further characterized by sublimation when exposed to air; wherein said back section and said seat section, when completely unfolded comprise dimensions corresponding to an exterior useable surface of a passenger seat installed on any of various means of public transportation vehicles, whereby said header is secured to a headrest of said passenger seat by means of the left and right fasteners, said back section substantially covers a seatback of said passenger seat, said seat section substantially covers a seat cushion of said passenger seat, said left tubular cuff substantially encompasses a left armrest of said passenger seat, said right tubular cuff substantially encompasses a right armrest of said passenger seat, and further, for storage and ease of transport, said protective seat cover may be easily compacted by means of folding the left wing inward along the left seam of the back section, folding the right wing inward along the right seam of the back section, and thereupon folding the seat section inward toward the back section a plurality of times until the adjoined back section and the seat section may be foldably placed into and stored within the confines of said pouch section.

5. A protective seat cover kit as in claim 4, wherein the header back section, seat section, right wing, and left wing are constructed from a fabric possessing a material property that allows water vapor to be transmitted through the material and further, allows air to pass through the fabric and further, said left and right fasteners comprise complementary segments of hook-and-felt type fastening mechanism.

6. A protective seat cover kit as in claim 4, wherein the under surface of the sani-pac may be attached to an inner surface of the pouch, either by adhesive, stitching, hook-and-felt mechanism, or other fastening means.

* * * * *